United States Patent [19]

Boynton

[11] Patent Number: 4,722,614
[45] Date of Patent: Feb. 2, 1988

[54] SEALABLE TAMPERPROOF CONTAINER AND METHOD OF MANUFACTURE

[76] Inventor: Herbert H. Boynton, 354 Vista de La Playa, La Jolla, Calif. 92037

[21] Appl. No.: 92

[22] Filed: Jan. 2, 1987

[51] Int. Cl.⁴ .............................................. B65D 33/14
[52] U.S. Cl. ......................................... 383/5; 383/69; 383/43; 206/621; 206/634; 215/32
[58] Field of Search .................. 383/5, 68, 69, 43, 80, 383/81; 206/601, 610, 620, 621, 630, 634, 210; 221/34, 63, 102, 135, 45; 220/345, 351, 265, 266; 215/32

[56] References Cited

U.S. PATENT DOCUMENTS

| | | | |
|---|---|---|---|
| 3,110,335 | 11/1963 | Antonius | 383/63 |
| 3,179,301 | 4/1965 | Lucht | 383/43 |
| 3,204,835 | 9/1965 | Michel | 215/32 |
| 3,437,117 | 4/1969 | Vitello et al. | 383/69 |
| 4,284,199 | 8/1981 | Bigarella | 220/266 |
| 4,570,820 | 2/1986 | Murphy | 206/210 |

*Primary Examiner*—Willis Little

[57] ABSTRACT

A container is provided that will minimize the possibility of tampering by unauthorized persons. The container is formed of a one-piece, thermoplastic material, preferable a transparent material, that would make any unauthorized entry in the container more readily visible to the buying public. The novel container is fabricated by a novel combined compression and blow molding process with a single opening that can be sealed after the container is filled. A closure cap is formed in the process as a portion of the unitary container, which cap can be readily separated from the container by the user for gaining access to the contents of the container, and thereafter used to seal the opening in the container between openings.

10 Claims, 13 Drawing Figures

SEALABLE TAMPERPROOF CONTAINER AND METHOD OF MANUFACTURE

BACKGROUND

This invention relates to containers, and more particularly to a tamperproof container fabricated as a unitary structure by a simple and expedient process.

The surreptitious tampering of containers, both food and especially medicinal containers, has caused a number of deaths and a deep concern by the buying public. In addition, the cost to manufactures in recalling large stocks of merchandise and of the redesign of the packaging is staggering.

As a consequence, a concentrated effort is underway by manufacturers to redesign their containers and packages to make them more tamperproof.

In addition to designing the containers to be more tamperproof, it is necessary for consumers to be more alert for signs of any tampering of packages and containers before using the contents.

SUMMARY OF THE INVENTION

A novel container is provided that is more tamperproof and inexpensive to fabricate. These results are achieved by making the container in a one-piece seamless structure making any attempt to cut into or pierce the container more visible by a close inspection by the potential user. Use of a transparent thermoplastic material is preferred because any tampering incision in the container will also be more noticeable. The container opening is biased to a normally closed position by the bulbous body portion that can be flexed to an open position by finger pressure. The container is fabricated with an integral closure cap member which can be twisted off the container to make the opening accessible, and thereafter used to seal the opening between uses. A pricing code tag can be sealed in the tear portion of the container after the filling operation, so that any tampering of the container opening will destroy the integrity of the code and make the store checker aware of the tampering.

OBJECTS OF THE INVENTION

A principal object of this invention is to provide a container, and a method of manufacture, that will make any tampering effort more obvious and more difficult to achieve.

Another important object is to provide a more tamperproof container that is seamless, and that can be made in one piece of a thermoplastic material, preferrably clear.

Still another object is to provide a container having an integral means for the user to tear open the container for dispensing the contents, and which means can be subsequently utilized for sealing the container opening between uses.

Further objects are to provide a container made of flexible material with a bulbous body that will bias the container opening to a normally closed position, and which can be flexed by finger pressure to open the container for dispensing the contents; and to provide a method of manufacture that is simple and inexpensive.

BRIEF DESCRIPTION OF THE DRAWINGS

FIG. 4a shows a cross section of the two sets of molds used in the novel method in an open position.

FIG. 4b shows a partial upper perspective view of a mold core insert.

FIG. 4c is a cross-sectional view of the molds showing the hot dipped, plastic coated core insert positioned within both sets of molds, and the upper compression mold set in a closed position around the upper end of the core insert.

FIG. 4d is a similar view as FIG. 4c showing both sets of molds in a closed position, with the blow molding step in progress.

FIG. 4e is a cross-sectional view of FIG. 4d after completion of the molding process with the core insert being removed.

FIG. 4f is a cross-sectional view of the finished container removed from the molds.

FIG. 4g is a similar view as 4f with the closure cap and the container mouth flexed open for filling.

DETAILED DESCRIPTION OF THE INVENTION

Figure 1:
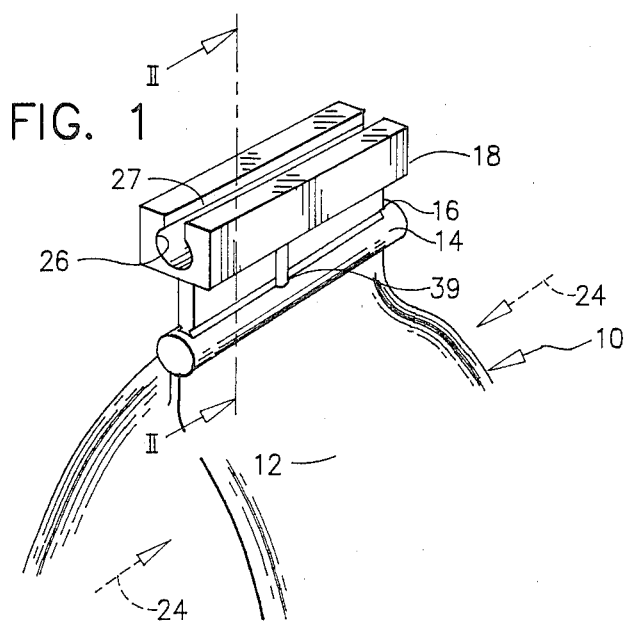
FIG. 1 is a front perspective view of the finished novel container.

Referring to the drawings where like reference numerals refer to similar parts throughout the Figures, there is shown in FIG. 1 a perspective view of the novel seamless container 10 having a flexible bulbous body portion 12, a shoulder portio 14, a neck portion 16, and a closure cap portion 18, all portions formed as an integral structure. Container 10 is fabricated by a novel method illustrated in FIGS. 4a to 4h and later to be described. The container is made of a thin thermoplastic material, such a polyethelene, having excellent fatigue strength and medicinally acceptable properties. A transparent plastic material is preferred for reasons later to be described.

Figure 2:
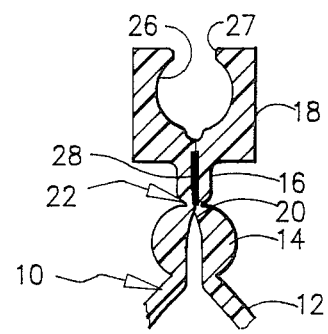
FIG. 2 is a partial enlarged cross-sectional side view taken along line II—II of FIG. 1.
Figure 2A:
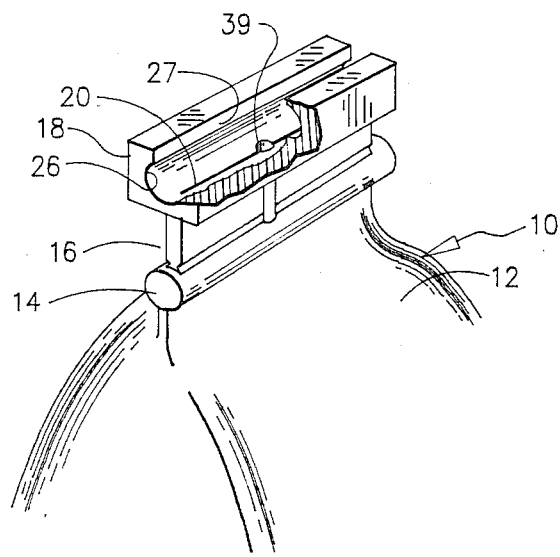
FIG. 2a is a perspective view of FIG. 2 with a portion in section.
Figure 2B:
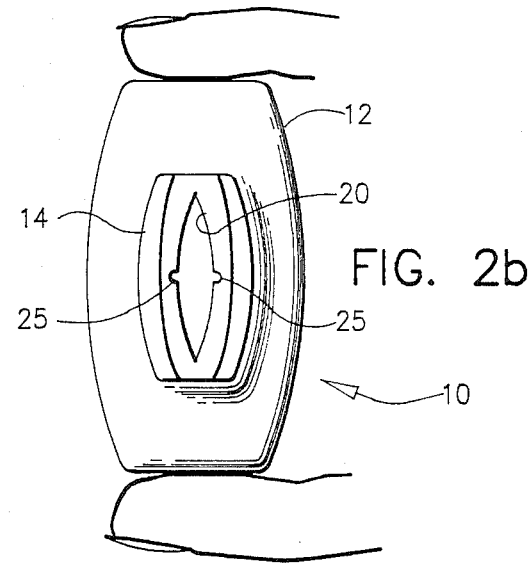
FIG. 2b is a top view of the finished container, with the closure cap having been removed, showing the body position being flexed by finger pressure to open the container.

As best shown in FIGS. 2 and 2a, container body is provided with an elongate mouth opening 20 at its upper end capable of being sealed closed at neck portion 16 having a longitudinal weakened area 22 (FIG. 2) adjacent shoulder 14. Access to container opening 20 is achieved by the user twisting off closure cap 18 along weakened area 22. Body portion 12 is best described as being bulbous, and is designed to bias opening 20 to a normally closed position. Opening 20 is forced open to dispense the container contents by the user applying finger pressure on opposite sides of the container body in a direction aligned with opening 20, illustrated by arrows 24 in FIG. 1 and in FIG. 2b. In FIG. 2b, a pair of circular recesses 25 are formed in shoulder portion 14 and neck portion 16 by raised passageway 39 of mold insert 34 (see FIG. 4b) assist in the flexing action.

Figure 3:
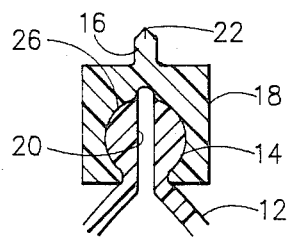
FIG. 3 is a similar view as FIG. 2 showing the closure cap slid over the container shoulder to seal the container when not in use.

As shown in FIGS. 1 and 2, the upper end of cap 18 has a longitudinal channel or slot 26 with a cross-sectional area conforming to the cross-sectional area of which shoulder can be circular or square. After cap 18 is torn off the container along weakened area 22 opening 20 can be sealed closed between uses by sliding cap 18 over shoulder 14, as shown in FIG. 3. The fit between shoulder 14 and slot 26 is sufficiently tight to make it unlikely that a small child can separate the connection, nor to understand how the connection works.

As previously noted, novel container 10 is fabricated as a unitary structure in one piece to avoid the existence of any seams that may be used to hide a razor cut or the like, in an attempt surreptitiously to gain access to the container for tampering purposes. Similarly, it is preferred that the container be made of transparent plastic that would make such an entry into the unitary structure more visible to the user.

Figure 4A:
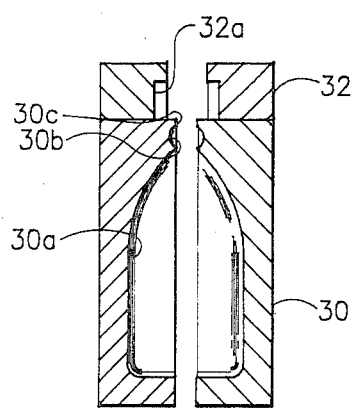
FIGS. 4a to 4g are sequential steps in the novel fabrication and filling process of the container of FIG. 1: namely.
Figure 4B:
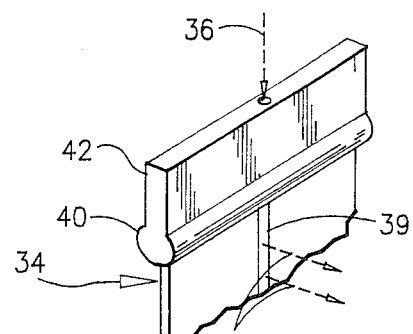
Figure 4C:
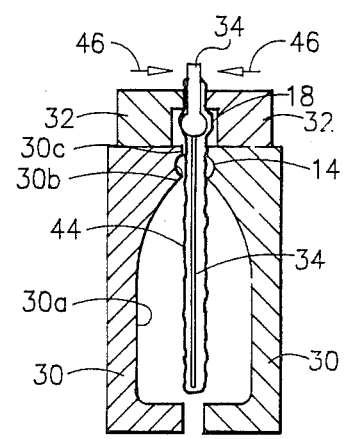
Figure 4D:
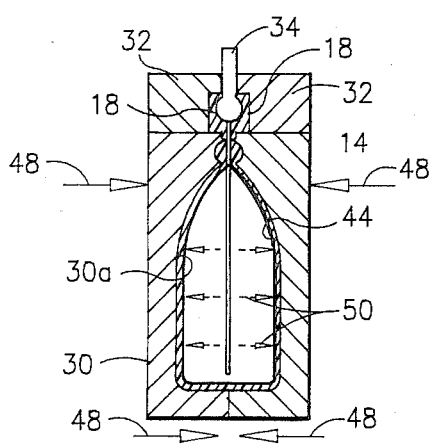
Figure 4E:
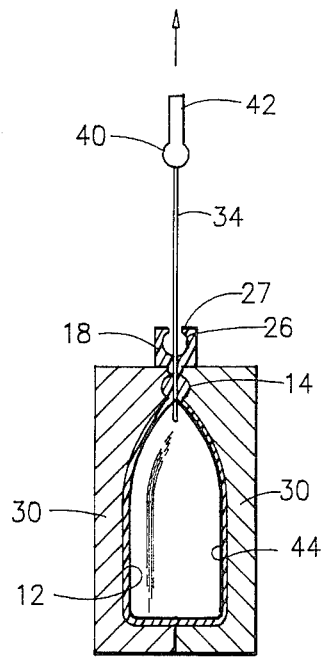
Figure 4F:
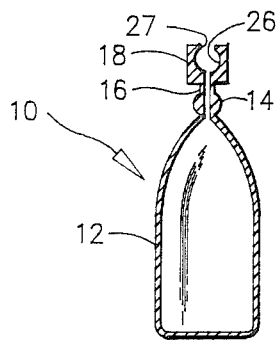
Figure 4G:
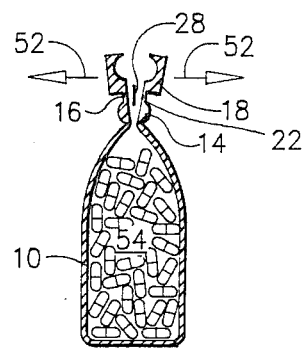
Figure 4H:
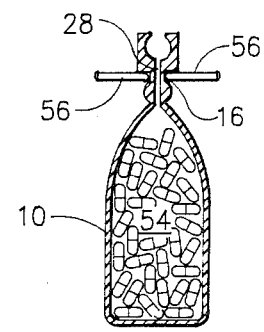
FIG. 4h shows the step of sealing the container neck to complete the packaging operation.

Another novel anti-tampering feature of the invention is the positioning of a conventional bar pricing code tag 28 in neck 16 (see FIG. 2) where it is sealed in position (see FIG. 4h). The code necessarily will be mutilated by any tampering at this area in order to gain access to the container opening that will be obvious to a store clerk at the checkout station because the computer will not be able to read the price data.

Still another important feature of this invention is the novel method of molding container 10 as described with reference to FIGS. 4a to 4h. FIG. 4a shows the two sets of mold halves 30 and 32 in their open position. Lower mold halves 30 have a cavity 30a in which body 12 (not shown) is blow molded; a cavity 30b for molding shoulders 14; and a cavity 30c for molding neck 16. Upper mold halves 32 form a cavity 32a for compression molding closure cap 18. FIG. 4b is a partial perspective view of the upper end of a mold insert 34 having an upper air inlet 36 leading a plurality of air outlets 38 longitudinally spaced in an enlarged raised passageway 39 along the length of the insert 34. Upper end of insert 34 has a cylindrical transverse englargement 40 for compression molding closure cap slot 26 and an integral extension 42 for compression molding opening 27 to cap slot 26.

FIG. 4c is a similar view as FIG. 4a with insert 34 inserted into the two sets of molds after having been dipped into a bath of hot thermoplastic material (usually around 300 degrees F) to form a liquid plastic coating 44 on the insert. The variable thickness of coating 44 necessary for the varying sizes of the above described cavities is determined by regulating the speed at which insert 34 is removed from the hot dip (not shown).

As shown in FIG. 4c, upper compression molds 32 are first closed over coated insert 34, indicated by arrows 46, to mold closure cap 18, and slotted portion 26 and its opening 27. Thereafter, as shown in FIG. 4d, lower mold halves are also closed, as shown by arrows 48, at which time air is injected into mold insert inlet 36 and distributed out of air outlets 38, shown by arrows 50, propelling the hot thermoplastic coating against mold cavity 30a to form body 12. During this process, mold halves 30 and 32 are water cooled to about 60–70 degrees F.

FIG. 4e shows upper compression molds 32 withdrawn from container 10 to allow mold insert 34 to be removed through slotted portion 26 and its opening 27 of closure cap 18. FIG. 4f shows the finished container 10 removed from mold halves 30. FIG. 4g is a similar view as FIG. 4f with closure cap 18, neck 16, and shoulder 14 suitably spread apart in the direction of arrows 52 for the filling of the container with contents 54. Bar code tag 28 is shown in position to be sealed in neck 16, if desired.

FIG. 4h shows the opening 20 of the filled container 10 of FIG. 4g being suitably sealed at neck portion 16, preferably by ultrasonic elements 56, or the like, with price code tag 28, when utilized, sealed in position in neck 16. Neck 16 is sufficiently narrow in length to prevent unauthorized separation by a blade or the like without mutilating price code tag 28.

Access to the filled container 10, by the user is accomplished by supporting body 12 by one hand, and with the other hand twisting closure cap 18 relative thereto until cap 18 breaks loose from the narrow neck along weakened area 22. After the desired amount of the container contents are dispensed, cap 18 can be inverted, and with cap slot 26 aligned with shoulder 14 slidably pushed thereover to seal the opening in the container (see FIG. 3). This connection is a tight fit so designed that a small child will be unable to remove the closure cap from the container even if the child can determine how the parts cooperate.

The present invention provides a novel container designed with several important features to make unlawful tampering unlikely. This result is achieved by making the entire container a unitary structure, preferably of a transparent thermoplastic material, by a unique process that accomplishes the objectives by a simple and low cost method of fabrication. Placing a price code tag at an area where tampering is most likely further enhances the security of the one-piece container.

I claim:

1. A sealable, tamperproof container comprising a seamless hollow bulbous body made of a thin flexible thermoplastic material;

said body having a thin, narrow elongate neck portion provided with an elongate opening for filling and dispensing the contents in the container body;

said neck portion adjacent the opening being biased by the body material normally to close the opening;

said opening being capable of being flexed to an open position by the application of a compressive finger pressure in a direction aligned with the opening;

said neck portion having a weakened area to facilitate tearing to gain acess to the opening;

an elongate closure cap integrally formed with the neck portion in one piece, and having an elongate opening contiguous with the elongate opening in the body through which openings the body is fillable;

said closure cap being severable at the weakened area of the neck portion and when removed from the body said closure cap being capable of sliding over the neck portion to block the body opening;

said openings in the closure cap and the neck portion being sealed closed after the container is filled.

2. The container of claim 1 wherein said neck portion has walls adjacent the elongate opening, each wall formed with opposing transverse recesses to facilitate the flexing action.

3. The container of claim 1 wherein said container is capable of being self supporting in an upright postion.

4. The container of claim 1 wherein said closure cap and the neck portion are made of the same piece of material.

5. The container of claim 1 wherein said body adjacent the neck portion has a shouldler, and said closure cap has a groove complimentary to the shoulder to enable a slidable connection.

6. The container of claim 1 wherein the material is a transparent thermoplastic to facilitate the appearance of a cut in the material for the purpose of indicating an unlawful entry into the container.

7. The container of claim 1 wherein a pricing bar code tag is sealed in the weakened area of the neck portion to be destroyed when the container is opened.

8. A method of fabricating a seamless unitary thermoplastic container having a bulbous body terminating in a closure cap portion separated by a thin-walled tearable neck portion having an opening to the body; said method being continuous and comprsing a series of sequential steps;

dipping a mold insert having a hot dipped coating of a thermoplastic material into two pairs of adjacent mold halves;

first closing one pari of mold halves around the hot dipped mold insert to compressive mold the closure cap, portion with an elongate opening;

thereafter cosing the second pair of mold halves around the remaining portion of the hot dipped mold insert to injection mold the body, shoulder and neck portions with an elongate opening to the container contiguous with the opening in the closure cap;

withdrawing the mold insert from the container through the neck portion and closure cap; and removing the molded container from the molds.

9. The method of claim 8 wherein is added the steps of; filling the molded container with the desired contents through said openings; and thereafter sealing the openings in the closure cap and neck portion to form the sealed unitary container.

10. The method of claim 9 wherein is added the step of inserting a pricing bar code tag in the opening in the neck portion prior to the sealing step.

* * * * *